United States Patent [19]

Wolf et al.

[11] Patent Number: 4,839,503

[45] Date of Patent: Jun. 13, 1989

[54] CONTROLLING THE SIMMERING OR COOKING TIME IN A COOKING VESSEL

[75] Inventors: Kurt Wolf; Wolfram K. Andre, both of Wildbad, Fed. Rep. of Germany

[73] Assignee: Fissler GmbH, Idar-Oberstein, Fed. Rep. of Germany

[21] Appl. No.: 130,787

[22] Filed: Dec. 9, 1987

[30] Foreign Application Priority Data

Dec. 10, 1986 [DE] Fed. Rep. of Germany ....... 3642180

[51] Int. Cl.$^4$ .............................................. H05B 1/02
[52] U.S. Cl. .................................. 219/497; 219/441; 219/494; 426/523; 99/329 R; 99/330
[58] Field of Search ............... 219/491, 494, 497, 501, 219/440, 441; 426/233, 510, 511, 243, 523; 99/329 R, 332, 330, 333, 335; 340/588, 589

[56] References Cited

U.S. PATENT DOCUMENTS

| | | | |
|---|---|---|---|
| 4,535,229 | 8/1985 | Wolf et al. | 219/440 |
| 4,541,733 | 9/1985 | Andre | 374/149 |
| 4,574,184 | 3/1986 | Wolf et al. | 219/440 |
| 4,585,925 | 4/1986 | Andre | 219/497 |
| 4,587,405 | 5/1986 | Andre | 219/491 |
| 4,587,406 | 5/1986 | Andre | 219/497 |
| 4,608,260 | 8/1986 | Andre | 426/233 |
| 4,614,441 | 9/1986 | Wolf | 374/130 |
| 4,620,083 | 10/1986 | Andre | 219/491 |
| 4,629,852 | 12/1986 | Andre | 219/497 |
| 4,682,012 | 7/1987 | Wolf et al. | 219/490 |
| 4,682,013 | 7/1987 | Andre et al. | 219/497 |
| 4,682,298 | 7/1987 | Andre | 364/557 |
| 4,700,052 | 10/1987 | Wolf et al. | 219/497 |

FOREIGN PATENT DOCUMENTS 3316799 8/1984 Fed. Rep. of Germany .
3314398 10/1984 Fed. Rep. of Germany .
3323399 1/1985 Fed. Rep. of Germany .

Primary Examiner—M. H. Paschall
Attorney, Agent, or Firm—Thomas W. Speckman

[57] ABSTRACT

The invention relates to controlling the simmering or cooking time in a cooking vessel which can be heated by means of an electrical cooking plate with a control circuit, in which the temperature in or on the cooking vessel is determined in the heating phase and utilized by the control circuit to regulate the heat output of the cooking plate by shutting off the cooking plate at a length of time before the completion of the predetermined simmering or cooking time, the time before completion being greater the greater the heat quantity determined from data from the heating phase. With heating starting at a temperature between the temperature necessary for the initiation of a significant steam formation and the boiling temperature of the water, the time period from reaching the boiling temperature up to the reaching of a predetermined measuring temperature lying slightly above the boiling temperature is measured, and the time period determined is used for the determination of the time period for the premature disconnection of the cooking plate which must be reduced by an amount which is greater the greater the starting temperature was above the temperature for initation of steam upon switching on the cooking plate.

11 Claims, 3 Drawing Sheets

CONTROLLING THE SIMMERING OR COOKING TIME IN A COOKING VESSEL

BACKGROUND OF THE INVENTION

1. Field of the Invention

This invention relates to controlling the simmering or cooking time in a cooking vessel which can be heated by means of an electrical cooking plate with a control circuit, in which the temperature in or on the cooking vessel is determined and utilized by the control circuit to regulate the heat output of the cooking plate, in which the simmering or cooking time can be set by means of an adjustable time element. The cooking plate can be shut off at a length of time before the completion of the predetermined simmering or cooking time, which shut off time difference is greater with the greater the heat quantity determined from data from the heating phase, and thus the cooling time of the resulting cooling process after the switching off of the cooking plate is greater.

2. Description of the Prior Art

German Patent Publication DE-OS No. 33 14 398 teaches a device in which information is obtained from the rise in the temperature during the heating phase as to the quantity of preferably fluid cooking material is contained in the cooking vessel, and how, as a result, the cooling process proceeds after the cooking plate is switched off. In this manner, the cooling process can be utilized to extend the simmering or cooking time. In this system it is to be considered that the simmering effect on the food is halved for approximately every 10° C. of reduction in temperature. It is therefore reasonable to only consider the secondary simmering after disconnecting the cooking plate up to the drop to approximately the boiling temperature of water with a steam pressure cooking pan in the pressure-free condition. The energy expenditure for the simmering or cooking process is thereby reduced to the minimum level, and an undesired extension of the simmering or cooking process by the cooling process is avoided. The simmering or cooking process set by the simmering or cooking time is thus maintained with regard to the quantity of cooking material in the cooking vessel and the cooling process which specifically arises.

German Patent Publication No. 33 16 799 teaches a device for a steam pressure cooking pan, in which the time period for attaining the temperature necessary for initialing significant steam formation is utilized up to reaching of the boiling temperature of the water, in order to obtain information as to how great the quantity of preferably solid cooking material is above the water bath. With an increasing quantity of cooking material, this time period correspondingly increases, and the heat quantity stored in the cooking material, rises correspondingly, so that the cooking plate can be correspondingly shut off in advance. The predetermined simmering or cooking time is correspondingly extended through the cooling phase, and thus maintained. With increasing time length, the disconnection of the cooking plate can thus be initiated correspondingly earlier.

It is also known to utilize both the increase of the temperature in the heating phase, as well as the time period which extends from the reaching of the temperature necessary for the initiation of significant steam formation up to the reaching of the boiling temperature of the water, in a device for the early switching off of the cooking plate, as German Patent Publication No. 33 23 399 demonstrates. In this system, the time span for shortening the on time of the cooking plate is derived from both forms of information. With a predetermined maximum increase of the temperature in the heating phase, only the predetermined time period for deriving the time period is utilized.

It has been shown that even when determining the increase of the temperature during the heating phase, false measurements are obtained if, when turning on the cooking plate, the starting temperature of the cooking material lies above room temperature. The increase in the temperature during the temperature measurement time changes with the same quantity of cooking material in dependence on the starting temperature. With increasing starting temperature, the increase in the temperature during the measurement time is slower. A larger quantity of cooking material is therefore misrepresented, and the derived shortened time span is thereby too great. The consequence of this is that the cooling process is too short and that, with the premature switching off of the cooking plate, the cooling phase is not sufficient to maintain the simmering or cooking time long enough for the predetermined simmering or cooking time to be attained. Higher starting temperatures are, however, frequently present. There should only be recalled the thorough searing of food in the cooking vessel. In this case, the cooking vessel is heated, and the food is then, for example, spoiled by the hot sludge. In this case, the starting temperature is, rather, in the temperature range between the temperature necessary to initiate a significant steam formation and the boiling temperature of the water. With these high starting temperatures, the heating phase up to the boiling temperature is no longer suited to obtain information about the cooling phase to be expected.

SUMMARY OF THE INVENTION

It is an object of this invention to provide a device of the type stated above in which, even with starting temperatures between the temperature necessary for initiation of significant steam formation and the boiling temperature of the water, information can be obtained which makes possible a premature switching off of the cooking plate, in order to be able to utilize the cooling phase to obtain the predetermined simmering or cooking time.

This object is achieved in accordance with the invention through the fact that, during a start with a starting temperature between the temperature necessary for the inititation of a significant steam formation and the boiling temperature, the time period from reaching of the boiling temperature up to reaching a predetermined measuring temperature slightly above the boiling temperature is measured and that the time period obtained for determining the time period for a premature disconnection of the cooking plate is reduced by an amount which is greater the higher the starting temperature was upon switching on the cooking plate.

It has been shown that the time period which extends from reaching the boiling temperature of the water up to reaching of a predetermined measuring temperature, can be utilized to determine the time period for the premature switching off of the cooking plate, if the time period so determined is subjected to an adjustment which is dependent upon the starting temperature at the time when the cooking plate is switched on. When the starting temperature becomes higher, the heat quantity necessary for reaching the boiling temperature of water decreases with the smaller the difference from the boiling temperature. The resulting extension of the determined time period is compensated by the fact that this time period is reduced all the more, the higher the starting temperature. Starting temperatures higher than the boiling temperature are, for physical reasons, not possible.

It has in this connection proven adequate that the time period determined is set back by an amount which increases in proportion to the increase in the starting temperature, and which, at a starting temperature corresponding to the temperature necessary to initiate significant steam formation, is zero. This means that the adjustment of the time period determined is only necessary if the starting temperature lies between the temperature necessary for the initiation of significant steam formation and the boiling temperature of the water.

In accordance with one embodiment, it is provided that the measured time period is used directly to determine the time period from which an amount is deducted which increases with the increase in temperature, proportionate to the starting temperature greater than the temperature necessary for the inititation of the steam formation at which the correction is zero. In deriving the time period and reducing the simmering or cooking time predetermined in the time element, it is to be considered that the simmering effect reduces in the cooling phase. The time period is thus only correspondingly adjusted in its deduction from the predetermined simmering or cooking time. The simmering or cooking process until the reaching of the boiling temperature in the switched-off phase thus lasts longer than is predetermined by the simmering or cooking time in the time element, but corresponds, however, in its simmering effect to the predetermined simmering or cooking time.

If the starting temperature lies below the temperature necessary for the initiation of a significant steam formation, then the development is, in the known manner, such that the temperature increase in the heating phase and/or the time period from the reaching of the temperature necessary for the initiation of a significant steam formation up to the reaching of the boiling temperature of the water is utilized directly to determine the time period for the premature switching off of the cooking plate. In this, the dependences are such that the time period is the greater, the shorter the temperature increase in the heating phase is, and the greater, the greater the time period is for traversing the temperature necessary for the initiation of a significant steam formation up to the boiling temperature of the water in the heating phase.

BRIEF DESCRIPTION OF THE DRAWING

The invention will now be illustrated in greater detail by means of drawings wherein.

DESCRIPTION OF PREFERRED EMBODIMENT

Figure 1:
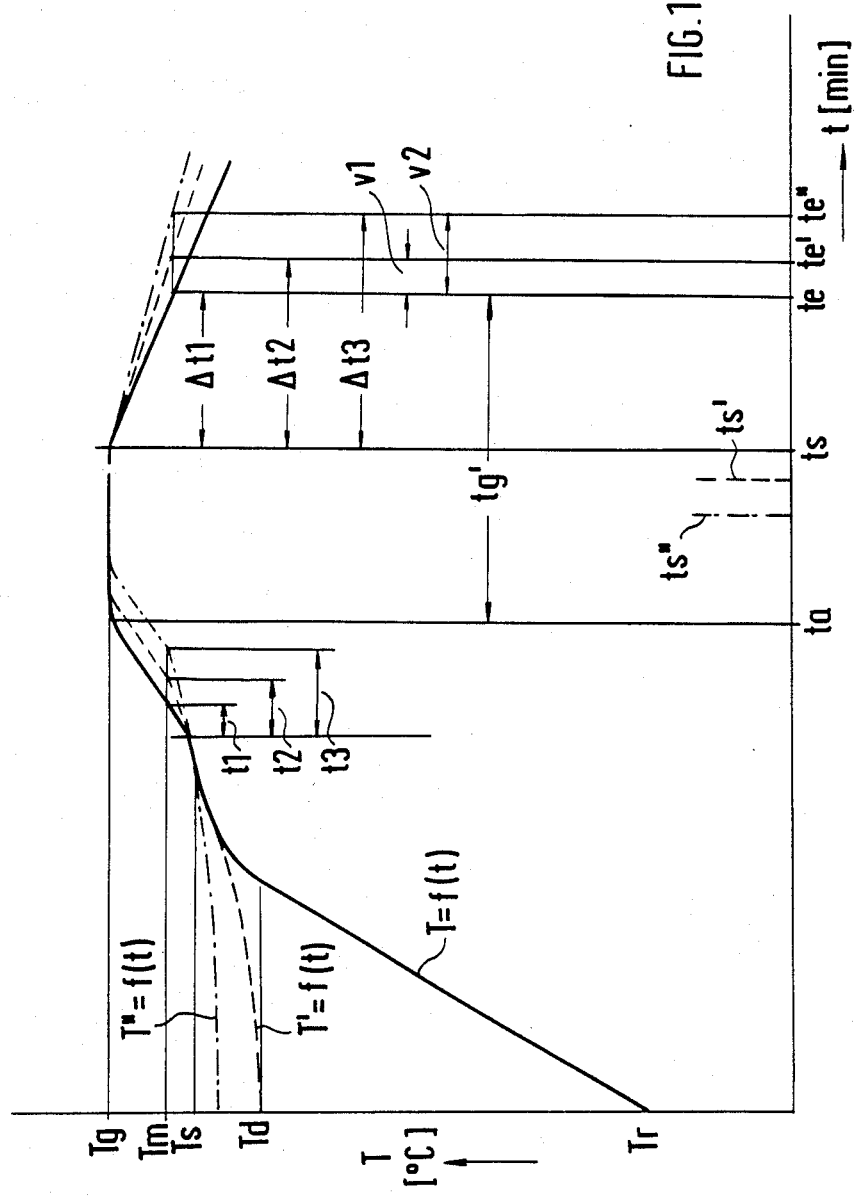
FIG. 1 is a temperature/time curve in a simmering or cooking process according to this invention.

FIG. 1 shows how the temperature T in °C. changes during the simmering or cooking process with time t in minutes. The solid curve T=f(t) begins at the time point t=0 with room temperature Tr, and then rises generally linearly up to a temperature of Td about 90° C. to about 92° C., at which steam formation begins. The transition from the temperature Td up to the boiling temperature Ts about 98° C. to about 100° C. takes place more gradually, and like the prior temperature increase, depends upon the content in the cooking vessel and on the starting temperature. If, at the time point ts, the cooking plate is disconnected, then the temperature decreases correspondingly in the cooling phase and provides the calculated cooling time.

When the simmering or cooking temperature Tg is reached during the heating phase, then the measurement of the predetermined simmering or cooking time is begun. The simmering or cooking process should, in the example shown in FIG. 1, be finished after the premature disconnection, when the cooking vessel again reaches the boiling temperature Tg during the cooling phase. This is the case, when the cooking plate has been earlier disconnected for the time period $\Delta t1$, $\Delta t2$, $\Delta t3$, . . . $\Delta tn$.

This time period $\Delta t1$ can be determined, in the normal simmering or cooking process beginning at room temperature Tr, from the temperature increase in the heating section of the curve $T=f(t)$ and/or from the traversal time from the temperature Td up to the temperature Ts, in accordance with the existing state of the art.

As the dashed and dash-dotted increasing portions of curves $T=f(t)$ and $T'=f(t)$ indicate, these characteristic values of the temperature/time curve are no longer suited for determining the time span $\Delta tn$, if the starting temperature lies in the temperature range between the steam forming temperature Td and the boiling temperature Ts. If the starting temperature lies in this temperature range, then, with the same cooking vessel and cooking material, the increase from the boiling temperature Ts up to the predetermined simmering or cooking temperature Tg changes as the dashed and dash-dotted lines indicate. In this case, the time period t2, t3, . . . tn is greater, the higher the starting temperature. If this time period t1, t2, t3, . . . tn is used for deducing the time period $\Delta tn$ for the premature switching off of the cooking plate, then this cannot be done without adjustment. As resulting cooling phase curves indicate, a greater time period t2, t3, . . . tn would also correspond to a larger time period $\Delta t2$, $\Delta t3$, . . . $\Delta tn$ which would exceed the time period $\Delta t1$ by the amounts of v1 v2, . . . vn respectively, although the cooling phase proceeds in accordance with the solid curve, that is, independently of the starting temperature. Use of the determined time periods tn for the direct derivation of the time period $\Delta tn$ would lead to the time period $\Delta t1$, $\Delta t2$, $\Delta t3$ . . . $\Delta tn$. The switching off of the cooking plate would thus already be undertaken at the time points ts, ts', ts'' and so on. The switching off would thus be undertaken earlier, the higher the starting temperature in the temperature range from Td to Ts. The time quantities v1, v2 . . . vn give these additional increases to the time period $\Delta t1$. Since the cooling phase at the time point of the disconnection ts, ts', ts'' and so on is, however, always equal to $\Delta t1$, then the predetermined simmering or cooking process would be shortened over the time tg by the amount of v1, v2 . . . vn. The time tg is greater than the preset simmering or cooking time, since the times of the cooling phase can only be used in a directed manner for the simmering process. Thus, the time period $\Delta t1$, even if only correspondingly reduced, is deducted from the preset simmering or cooking time tg.

Figure 3:
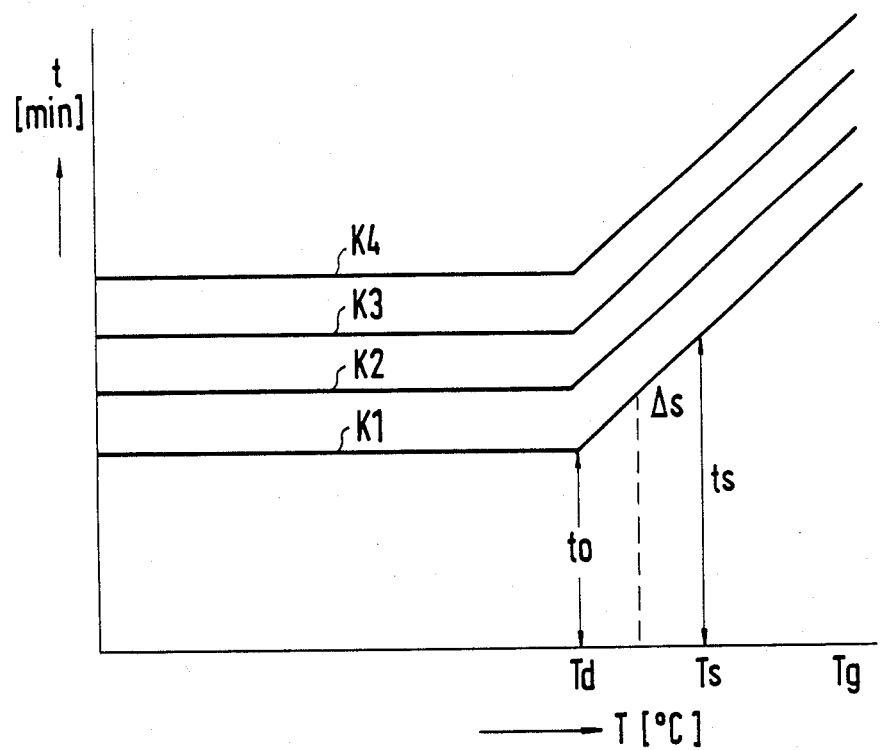
FIG. 3 is a curve showing the dependence of the time period determined based upon the starting temperature and the quantity of cooking material.

In order to avoid this shortening of the preset simmering or cooking time, a correction of the determined time periods t1, t2, t3 ... tn is necessary. If FIG. 3 is considered, then it is evident that the time period t up to the temperature Td at 92° C. is practically constant, if the quantity of the cooking material K1, K2, K3, K4 in the cooking vessel does not change. From the figure, it is seen that the time period t changes roughly in proportion to the quantity of cooking material. If the starting temperature lies above the temperture Td, then, with a constant quantity of cooking material, an increase in the time period t begins, which increases proportionately with the starting temperature T, and in the same manner for all quantities of cooking material. The time period determined ts must therefore be reduced by the amount Δs, in order to obtain the time period "to" which corresponds to the quantity of cooking material present, which can be used for deriving the time period Δt1, as is specified to the corresponding cooling phase. As FIG. 3 further demonstrates, the amount Δs is independent of the quantity of cooking material, and only dependent on the starting temperature T if the curves in accordance with the FIG. 3 are considered as approximations to the actual process curve.

This correction is necessary in order to consider the quantity of heat stored in the heating system comprising the cooking plate and cooking vessel. The stored quantity of heat is small, if the starting temperature is very high, that is, lies barely above the boiling temperature.

Figure 2:
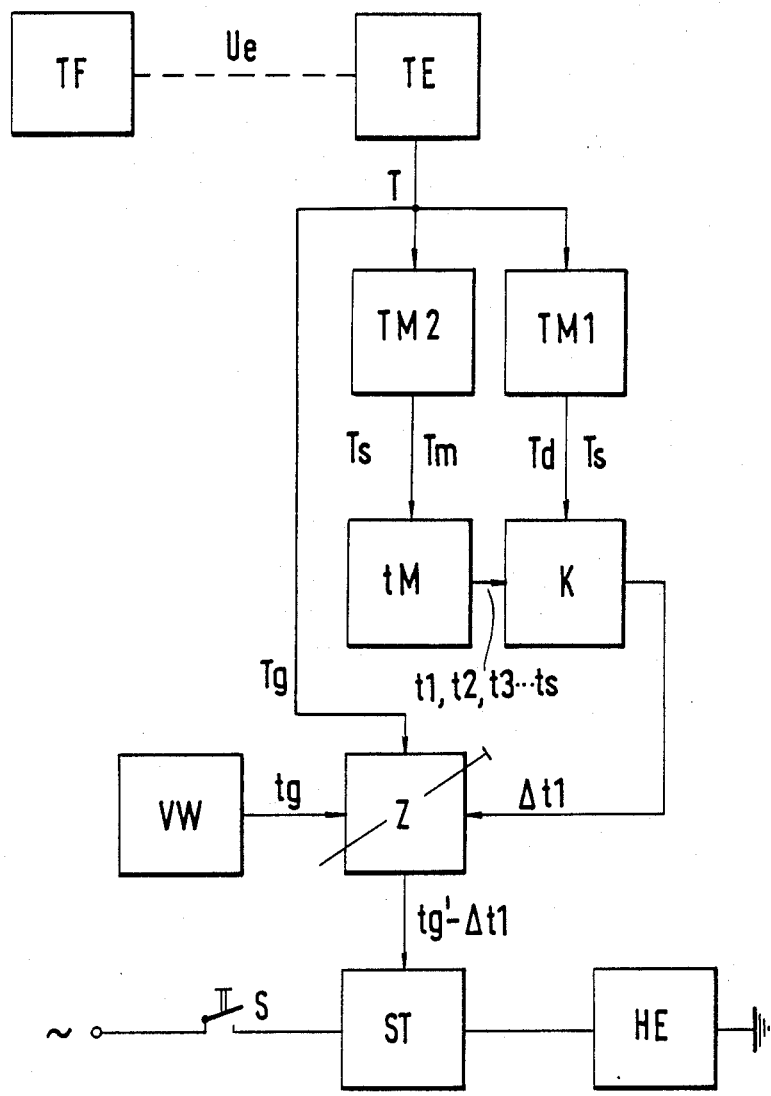
FIG. 2 is a simplified circuit diagram of a device according to this invention.

FIG. 2 shows, in schematic diagram, a device with the temperature sensor TF in or on the cooking vessel. The temperature sensor TF transmits, over the transmission gap Ue, the signal corresponding to the measured temperature to the temperature receiver TE, which conveys the temperature value T, for example, in digital form, to the temperature measuring circuits TM1 and TM2. The temperature measuring circuit TM2, output signals are emitted upon reaching the temperature Ts, and upon reaching a measuring temperature Tm are conveyed to the time measuring circuit tM, which determines from this the time period t1, t2, t3 ... tn, and conveys this to the correction circuit K. The correction circuit K, from the conveyed starting temperature in the temperature range Td to Ts and the conveyed time period t1, t2, t3 ... tn, determines the time period Δt1 for the premature disconnection of the cooking plate, which corresponds to the solid curve in FIG. 1, and corresponds to the actual cooling phase. The desired simmering or cooking time tg is fed to the adjustable time element Z through the preselection circuit VW. The time period Δt1 is, however, not completely deduced from the preselected simmering or cooking time tg, since, in the cooling phase, when the temperature decreases, the simmering effect decreases. The time tg of the simmering or cooking process is thus greater than the predetermined simmering or cooking time tg. The cooking plate is, however, disconnected at the time point ts, which is derived from the difference of tg − Δt1.

The time period Δt1 is derived from the predetermined simmering or cooking time tg as a correspondingly reduced time, and, if this reduced time has elapsed, then the heating element HE is disconnected at the time point ts, through the control circuit ST, from which the heating element has been disconnected by means of the switch S. The time point ts thus corrected is then so determined in dependence on the starting temperature so that with the normal cooling phase, a simmering or cooking process corresponding to the preselected simmering or cooking time is ended. The time period t1, t2, t3 ... tn is determined from the reaching of the boiling temperature Ts up to the reaching of the measuring temperature Tm of about 104° C.

We claim:

1. An apparatus for controlling a cooking time in a cooking vessel which is heated by means of an electrical cooking plate with a control circuit defining a cooling time, in which the temperature in the cooking vessel is determined and utilized by the control circuit to regulate the heat output of the electrical cooking plate, in which the cooking time can be set by means of an adjustable time element, in which the cooking plate can be shut off at a length of time before completion of a predetermined cooking time, such length of time being greater the greater the heat quantity determined from data from the heating phase, and thereby results in a cooling process after the cooking plate is switched off, said apparatus comprising: a time measuring circuit (tM) for measuring a time period (tn) defined as the time from the reaching of a boiling temperature (Ts) to the reaching of a predetermined measuring temperature (Tm) above said boiling temperature (Ts) in a heating phase with a starting temperature (T) between the temperature (Td) necessary for the initiation of a significant steam formation and the boiling temperature (Ts) of the water; and a correction circuit (K) for correcting said determined time period (tn) of a time span (Δtn) for a premature disconnection time (ts) of said cooking plate which is a function of the starting temperature (T) and is reduced by an amount (Δs), which is greater the higher said starting temperature (T).

2. An apparatus according to claim 1, wherein said temperature (Td) is about 90° to about 92° C.; said temperature (Ts) is about 98° to about 100° C.; and said temperature (Tm) is about 104° C.

3. An apparatus according to claim 2 having means correcting said time period (tn) by said amount (Δs) derived directly from quantity of heat in said cooking vessel directly dependent upon quantity of contents of said cooking vessel.

4. An apparatus for controlling a cooking time in a cooking vessel which is heated by means of an electrical cooking plate with a control circuit defining a cooling time, in which the temperature in the cooking vessel is determined and utilized by the control circuit to regulate the heat output of the electrical cooking plate, in which the cooking time can be set by means of an adjustable time element, in which the cooking plate can be shut off at a length of time before completion of a predetermined cooking time, such length of time being greater the greater the heat quantity determined from data from the heating phase, and thereby results in a cooling process after the cooking plate is switched off, said apparatus comprising: means for measuring a time period (tn) defined as the time from the reaching of a boiling temperature (Ts) to the reaching of a predetermined measuring temperature (Tm) above said boiling temperature (Ts) in a heating phase with a starting temperature (T) between the temperature (Td) necessary for the initiation of a significant steam formation and the boiling temperature (Ts) of the water; and means for correcting said determined time period (tn) of a time span (Δtn) for a premature disconnection time (ts) of said cooking plate which is a function of the starting temperature (T) and is reduced by an amount (Δs), which is the greater the higher said starting temperature (T); and means using said time period (tn) directly to determine said time span (Δtn), whereby, with said starting temperature (T) greater than said temperature (Td) necessary for the initiation of significant steam formation said amount (Δs) is deducted, which increases proportionately with the temperature increase above said temperature (Td) and for which said temperature (Td) is a base line.

5. An apparatus according to claim 4, comprising means adjusting said preset cooking time (tg) in the cooling phase by measurements obtained from the reaching of a cooking temperature (Tg) in the heating phase up to the reaching of said boiling temperature (Ts) and said disconnection time (ts) of said cooking plate is so selected that, upon reaching said boiling temperature (Ts) in the cooling phase, said cooking process is ended corresponding to said preselected cooking time (tg).

6. An apparatus according to claim 5, comprising means directly determining said time period (Δtn) for the premature disconnection of the cooking process from measurement of the temperature increase in the heating phase and the time period from the reaching of said temperature (Td) necessary for the initiation of a significant steam formation up to the reaching of said boiling temperature (Ts) of water with a starting temperature (T), which is less than the temperature (Td) necessary for the initiation of a significant steam formation.

7. A process for controlling a cooking time in a cooking vessel which is heated by means of an electrical cooking plate with a control circuit defining a cooling time, in which the temperature in the cooking vessel is determined and utilized by the control circuit to regulate the heat output of the electrical cooking plate, in which the cooking time can be set by means of an adjustable time element, in which the cooking plate can be shut off at a length of time before the completion of the predetermined cooking time, such length of time being greater the greater the heat quantity determined from data from the heating phase, and thereby results in a cooling process after the cooking plate is switched off, said process comprising: measuring a time period (tn) defined as the time from the reaching of said boiling temperature (Ts) to the reaching of a predetermined measuring temperature (Tm) above said boiling temperature (Ts) in a heating phase with a starting temperature (T) between the temperature (Td) necessary for the initiation of a significant steam formation and said boiling temperature (Ts) of the water; and correcting said determined time period (tn) of a time span (Δtn) for a premature disconnection time (ts) of said cooking plate which is a function of the starting temperature (T) and is reduced by an amount (Δs), which is greater the higher said starting temperature (T).

8. A process according to claim 7, wherein said temperature (Td) is about 90° to about 92° C.; said temperature (Ts) is about 98° to about 100° C.; and said temperature (Tm) is about 104° C.

9. A process according to claim 8, comprising correcting said time period (tn) by said amount (Δs) derived directly from quantity of heat in said cooking vessel directly dependent upon quantity of contents of said cooking vessel.

10. A process for controlling a cooking time in a cooking vessel which is heated by means of an electrical cooking plate with a control circuit defining a cooling time, in which the temperature in the cooking vessel is determined and utilized by the control circuit to regulate the heat output of the electrical cooking plate, in which the cooking time can be set by means of an adjustable time element, in which the cooking plate can be shut off at a length of time before the completion of the predetermined cooking time, such length of time being greater the greater the heat quantity determined from data from the heating phase, and thereby results in a cooling process after the cooking plate is switched off, said process comprising: measuring a time period (tn) defined as the time from the reaching of said boiling temperature (Ts) to the reaching of a predetermined measuring temperature (Tm) above said boiling temperature (Ts) in a heating phase with a starting temperature (T) between the temperature (Td) necessary for the initiation of a significant steam formation and said boiling temperature (Ts) of the water; and correcting said determined period (tn) of a time span (Δtn) for a premature disconnection time (ts) of said cooking plate which is a function of the starting temperature (T) and is reduced by an amount (Δs), which is greater the higher said starting temperature (T); and using said time period (tn) directly to determine said time span (Δtn), whereby, with said starting temperature (T) greater than said temperature (Td) necessary for the initiation of a significant steam formation said amount (Δs) is deducted, which increases proportionately with the temperature increase above said temperature (Td) and for which said temperature (Td) is a base line.

11. A process according to claim 10, comprising adjusting said preset cooking time (tg) in the cooling phase by measurements obtained from the reaching of a cooking temperature (Tg) in the heating phase up to the reaching of said boiling temperature (Ts) and selecting said disconnection time (ts) of said cooking plate so that upon reaching said boiling temperature (Ts) in the cooling phase, said cooking process is ended corresponding to said preselected simmering or cooking time (tg).

* * * * *